(12) United States Patent
Simon (10) Patent No.: US 11,287,953 B1
(45) Date of Patent: Mar. 29, 2022

(54) ONE-CLICK SEQUENTIAL IDENTIFIER FOR USER INTERFACE

(71) Applicant: SAP SE, Walldorf (DE)

(72) Inventor: Patrick Simon, Beckingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/147,523

(22) Filed: Jan. 13, 2021

(51) Int. Cl.
*G06F 3/0482* (2013.01)
*G06F 3/04817* (2022.01)

(52) U.S. Cl.
CPC ........ *G06F 3/0482* (2013.01); *G06F 3/04817* (2013.01)

(58) Field of Classification Search
CPC .................................................. G06F 3/048–05
See application file for complete search history.

(56) References Cited

U.S. PATENT DOCUMENTS

| | | | | |
|---|---|---|---|---|
| 5,736,985 A * | 4/1998 | Lection | ................. | G06F 3/0481 715/840 |
| 6,493,000 B1 * | 12/2002 | Wynn | ..................... | G06F 16/95 715/733 |
| 6,512,527 B1 * | 1/2003 | Barber | ................... | B64D 43/00 340/945 |
| 7,992,102 B1 * | 8/2011 | De Angelo | ......... | G06F 3/04886 715/834 |
| 8,510,668 B1 * | 8/2013 | Raskin | ................ | G06F 3/04812 715/767 |
| 8,549,436 B1 * | 10/2013 | Capriati | ................ | G06F 3/0483 715/838 |
| 9,423,925 B1 * | 8/2016 | Rajaraman | ............ | G06F 3/0482 |
| 2002/0122068 A1 * | 9/2002 | Tsuruoka | ................ | A63F 13/10 715/810 |
| 2003/0098891 A1 * | 5/2003 | Molander | ............. | G06F 3/0482 715/841 |
| 2003/0193525 A1 * | 10/2003 | Nygaard, Jr. | ......... | G06F 3/0482 715/810 |
| 2005/0119031 A1 * | 6/2005 | Spalink | ............. | H04M 1/72469 455/566 |
| 2005/0120142 A1 * | 6/2005 | Hall | ........................ | B04B 13/00 710/1 |
| 2006/0069989 A1 * | 3/2006 | Jones | ..................... | G06F 3/0482 715/273 |
| 2006/0282758 A1 * | 12/2006 | Simons | ............... | G06F 16/9577 715/210 |

(Continued)

*Primary Examiner* — Daniel Rodriguez
(74) *Attorney, Agent, or Firm* — Buckley, Maschoff & Talwalkar LLC (57) ABSTRACT

Provided is a system and method for an interactive one-click smart identifier that can be used to replace a traditional drop-down menu, combo box, or the like. Each click can change the identifier without a need to interact with a menu. In one example, the method may include storing a sequential order for a plurality of identifiers, displaying a currently selected identifier from among the plurality of identifiers at a predetermined position on a user interface and hiding remaining identifiers from among the plurality of identifiers from being displayed on the user interface, detecting a click on a predefined graphical element of the user interface, and in response to detection of the click, deleting the currently selected identifier from the user interface and replacing it with a hidden identifier from among the remaining identifiers not displayed on the user interface based on the sequential order.

21 Claims, 7 Drawing Sheets

(56) References Cited

U.S. PATENT DOCUMENTS

| | | | |
|---|---|---|---|
| 2007/0266340 A1* | 11/2007 | Cheng | G06F 3/0483 715/810 |
| 2010/0281374 A1* | 11/2010 | Schulz | G06F 3/0482 715/723 |
| 2011/0022987 A1* | 1/2011 | Brubaker | G06F 3/0482 715/847 |
| 2012/0010995 A1* | 1/2012 | Skirpa | G06F 16/95 705/14.49 |
| 2012/0110453 A1* | 5/2012 | Ma | G06F 16/54 715/716 |
| 2013/0061170 A1* | 3/2013 | Friedlander | G06F 3/048 715/800 |
| 2015/0091812 A1* | 4/2015 | Sood | G06F 3/0487 345/173 |
| 2015/0095785 A1* | 4/2015 | Edge | G06F 3/0481 715/731 |
| 2016/0132225 A1* | 5/2016 | Lee | G06F 40/106 715/731 |
| 2017/0068402 A1* | 3/2017 | Lochhead | G06F 3/0482 |
| 2017/0192632 A1* | 7/2017 | Lavonen | G06F 3/04845 |
| 2017/0344895 A1* | 11/2017 | Roy | G06F 3/0484 |
| 2018/0032212 A1* | 2/2018 | Choi | H04L 63/10 |
| 2020/0026397 A1* | 1/2020 | Wohlstadter | G16C 20/10 |

* cited by examiner

Record 1 — Owner Signature received (11:23am) ✓ Available [Verify]

Record 2 — Delivery signed for by receiver (2:48pm) ✗ Missing [Verify]

Record 3 — Inspection finalized and signed (9:17am) ✓ Available [Verify]

Record 4 — Lease agreement details (12:52pm) ⊘ Not Relevant [Verify]

. . .

Record N — Contract signed by both parties (3:35pm) △ Not Verified [Verify]

FIG. 7 ns without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

ONE-CLICK SEQUENTIAL IDENTIFIER FOR USER INTERFACE

BACKGROUND

To interact with functions of a software application, a user is typically provided commands and tools that are integrated within a user interface (UI). One common UI element is a menu, for example, a drop-down menu, a pop-up menu, a pull-out menu, and the like. Other examples include radio buttons, checkboxes, scroll bars, and the like. When a function provides multiple options that are capable of being selected, it is necessary for the user interface to provide multiple selectable actions corresponding thereto. For example, in the case of a drop down menu, a user must select a menu item (e.g., from a menu bar) which causes the menu to "drop-down" and then the user must make a selection from among the selectable actions displayed in the dropped-down menu. Thus, a user must input multiple commands to open the menu and make a selection. As another example, in the case of a radio button, each selectable action is assigned its own radio button. In this example, the user only needs to make one selection, however, giving each selectable action its own radio button on the screen takes up significant screen space.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Software applications including native applications, web applications, mobile applications, and the like, can require an extensive number of functions. Often, an application is designed with one or more menus (bar, panel, tab, etc.) for opening different content and navigating to different functions. The menu is usually integrated within the content template of the application. In order to interact with the menu, a user must first select a button, icon, tab, etc. on the user interface, which opens the menu. Next, the user must traverse the menu (e.g., scrolling up and down the screen) until a desired menu item is selected by a cursor. Then, the user can enter a command which causes the desired menu item to finally be selected. However, this process requires multiple input commands and a scroll command each time a desired menu item is to be selected. For users that must repetitively perform a menu operation, the process can be very time consuming.

Figure 1A:
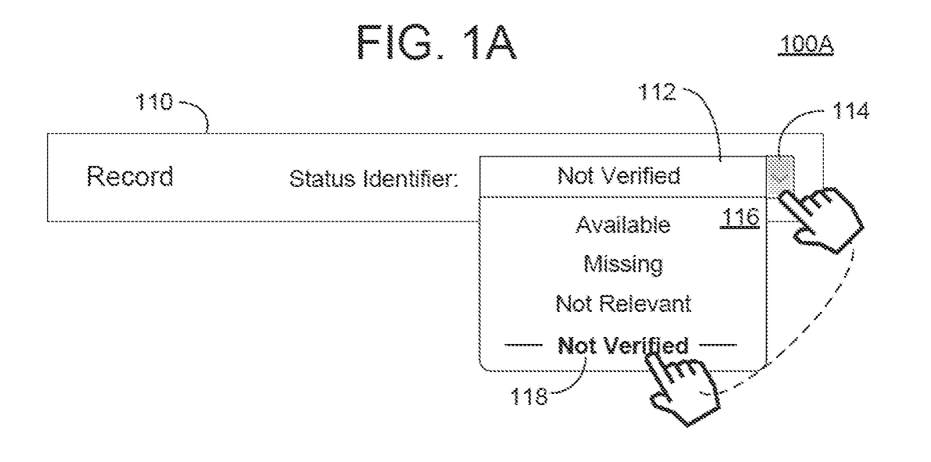
FIGS. 1A-1C are diagrams illustrating examples of multi-click menu interaction in accordance with an example embodiment.
Figure 1B:
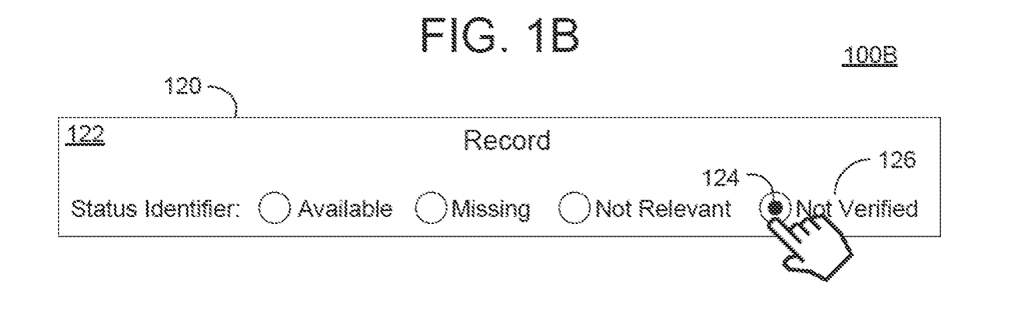
Figure 1C:
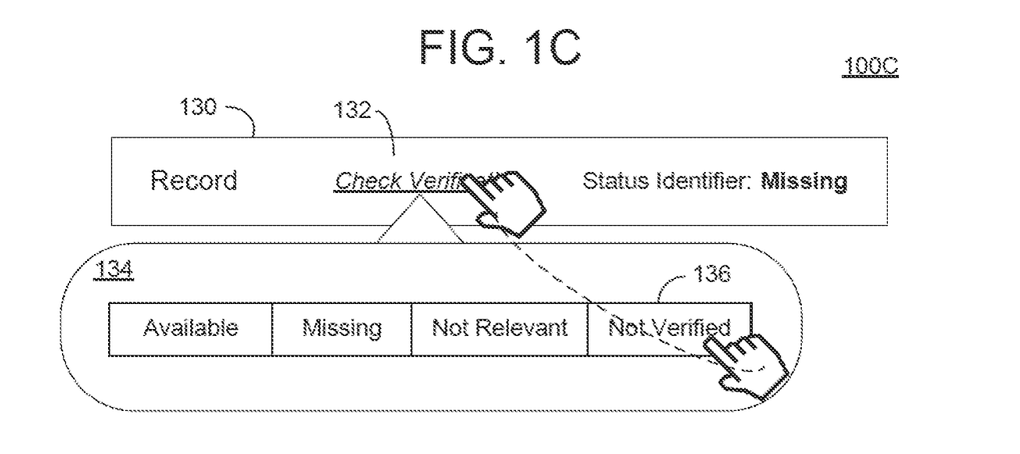

FIGS. 1A-1C are diagrams illustrating examples of multi-click menu interaction in accordance with an example embodiment. However, each of these examples has various drawbacks. Referring to FIG. 1A, a process 100A of interacting with a drop down menu 116 is shown. In this example, the user moves a cursor to a position on the screen that hovers over button 114 (drop down button) of a menu bar 112 and clicks on the button 114 which causes the drop down menu 116 to drop down from the menu bar 112 revealing a number of menu items (Available, Missing, Not Relevant, Not Verified, etc.) that are capable of being selected and applied to designate the status of a record 110. After pressing the button 114 and pulling down the menu 116, the user the moves the cursor on the screen until the cursor is positioned over the selectable action 118 within the menu 116. Here, the user clicks on the selectable action 118 which then selects the status identifier (Not Verified) from the menu 116 and applies it to the record 110.

However, the drop-down menu 116 requires multiple clicks in order to make a selection of an item from the menu 116. In particular, a user must make a first click on the button 114, move the cursor on the screen, and make a second click on the selectable action 118. Any incorrect or inadvertent selecting of a menu item makes a selection on a wrong item and requires an undo command or commands, and the process to be restarted. Furthermore, while the menu 116 is in a dropped-down state, the menu 116 is covering any content below the record 110, such as another record, etc.

FIG. 1B illustrates a process 100B of interacting with a radio button group 122 which includes a plurality of selectable actions that each include their own radio button. Here, a user selects the item 126 by clicking on a radio button 124. However, the radio button group 122 requires screen space to be devoted to each of the different selectable actions at the same time causing more space to be consumed.

FIG. 1C illustrates a process 100C of interacting with a segmented menu 134. Here, a record 130 includes an identifier 132 with a link (underline) or other graphical marker. The user can move a cursor to hover over a position of the identifier 132, and click on the identifier 132 which causes the segmented menu 134 to pop-up underneath the record 130. The user can then move the cursor to a position of any of the segments, (e.g., a segment 136) and click on the segment 136 thereby selecting the status identifier. However, segmented menu 134 include drawbacks of both the drop-down menu 116 shown in FIG. 1A and the radio button group 122 shown in FIG. 1B. In particular, the segmented menu 134 requires multiple clicks, and it takes up significant space because each item must be given screen space at the same time.

The example embodiments provide a new interactive user interface element that improves upon the drawbacks of the interactive elements shown in FIGS. 1A-1C, and others not shown. A single click (e.g., mouse press, keyboard press, touch on the user interface, vocal command, gesture, etc.) can change a currently displayed identifier with another identifier. The currently displayed identifier can be erased from the screen and the next identifier can be displayed in its place. In other words, the next identifier may displayed at a same vertical height and a same horizontal width as the currently displayed identifier without the need for a menu. Furthermore, only one identifier may be displayed on the screen at the same time. For example, the currently displayed identifier may be deleted from the screen and the next identifier may be simultaneously displayed (or almost simultaneously) such that both identifiers are never on the screen at the same time.

The order of identifiers may be sequential, and circular. The sequential order may be stored internally within the application. Rather than detecting a user moving a cursor over a menu item, the application may select a next identifier from the sequential order stored internally within the application's memory. When the application reaches a last identifier in the sequence, the application may start back over again and select a first identifier in the sequence. Furthermore, the order of identifiers may be modified. For example, the initial sequential order may be set by default when the application is opened on the screen, a page is loaded, etc. A user may select a settings command and open a list of the identifiers, in sequential order. Here, the user may re-arrange the position of the identifier within the list based on commands entered via the user interface, such as drag-and-drop, scroll, keyboard commands, etc. In some embodiments, one or more of the identifier may be static and unmovable. In other words, a position of the static identifier in the sequential order may not be changed.

There are different implementations of the one-click identifier. The one-click identifier may be displayed or otherwise embedded within a panel or background of the application as general text on the screen, and not included within a menu. Here, a button or other element may be disposed adjacent to (e.g., horizontally parallel to, vertically above, at an angle, etc.) the identifier. The user may move a cursor or other input mechanism over the position of the button on the user interface. Each click (e.g., pressing and releasing of a mouse key, pressing a keyboard key, touch on the screen, etc.) may cause the identifier disposed adjacent to the button to change based on the predefined sequential order. In another embodiment, the identifier itself may be an interactive element. In this case, the identifier may be a link or other graphical element without the need for a button. In this embodiment, when the user hovers the cursor over the identifier itself and enters the click (e.g., pressing and releasing of a mouse key, pressing a keyboard key, touch on the screen, etc.), the identifier is erased from the screen and a next identifier in the sequence is displayed in its place.

Figure 2:
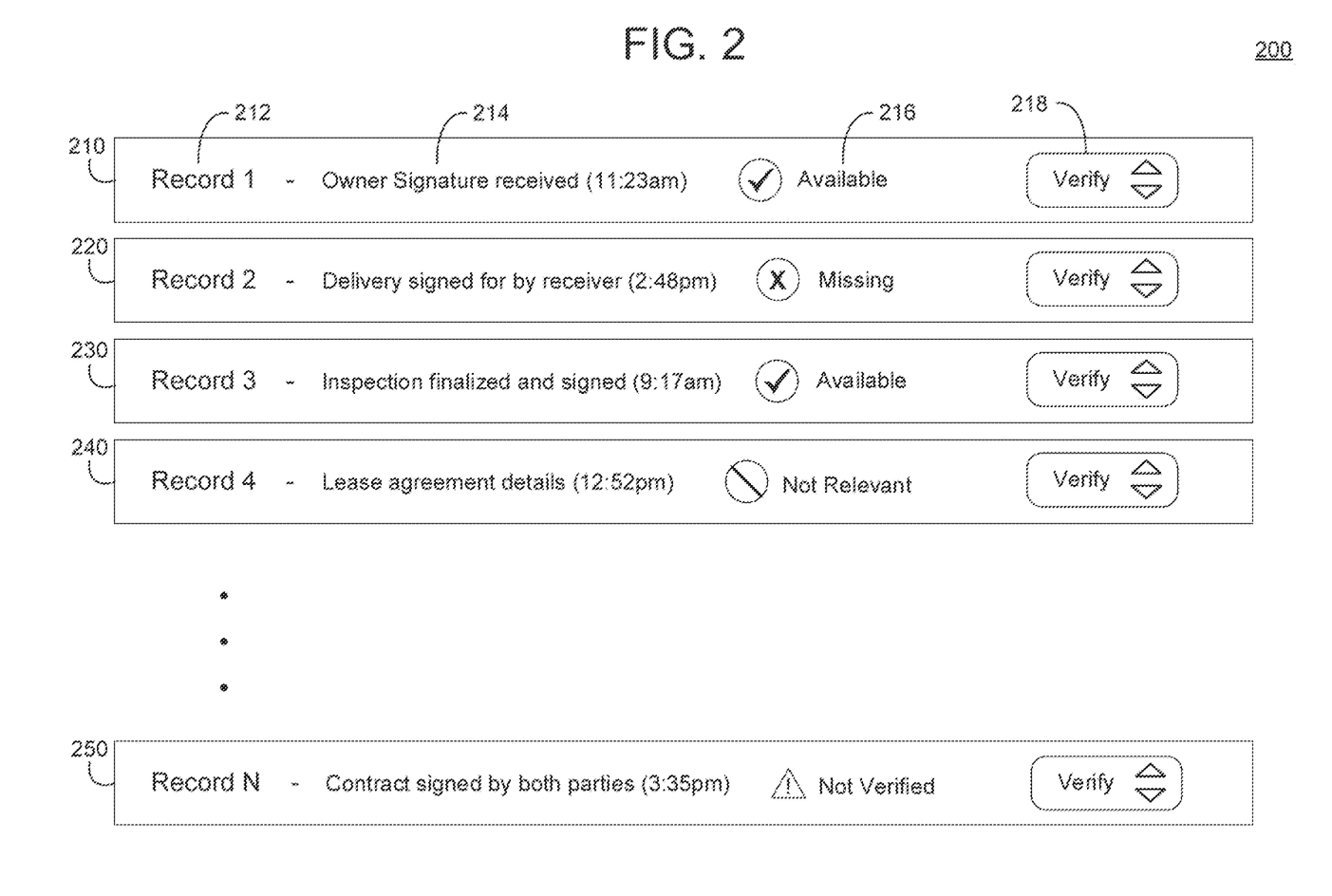
FIG. 2 is a diagram illustrating a user interface displaying a plurality of records which each include a one-click identifier in accordance with example embodiments.

FIG. 2 illustrates a user interface displaying a plurality of records 210-250 which each include a one-click identifier in accordance with example embodiments. It should be appreciated that the list of records 210-250 which include the one-click identifier is just one example of how the one-click identifier described herein may be implemented. Other examples include replacing any kind of menu with a one-click identifier, any type of combo box, any type of sequence box, or the like. The one-click identifier may be part of the application's template.

Referring to FIG. 2, each record 210-250 includes a record identifier 212, a description or label 214 of the record item, a status identifier 216, and a button 218. The attributes of the records 210-250 are not limited to the example shown in FIG. 2, and it should be appreciated that any of these attributes may be removed and other attributes may be added. In this example, the one-click identifier is implemented through a combination of the status identifier 216 and the button 218. Each record includes its own respective status identifier 216 and button 218 that are capable of being interacted with via a cursor, a touch, a keyboard command, or the like.

FIGS. 3A-3E illustrate a process of interacting with a one-click identifier in accordance with an example embodiment. In these examples, a one click identifier (316A-316D) is implemented through a combination of an identifier position 313 and a button 314. The identifier that is displayed in the identifier position 313 may change based on a predefined sequential order that is stored in a background of the application, for example, in an underlying application data store along with a serial number, a name, a code, etc. that uniquely identifies the one-click identifier with respect to other one-click identifiers within the application. The identifier position 313 may be a static pixel location within the user interface where the identifier is displayed. The identifier position 313 is a static position within a page (e.g., web page, application page, etc.)

In the example of FIGS. 3A-3E, the identifier position 313 includes both text content and an icon of an initial identifier 316A. This is just one example. The identifier position 313 may display any desired identifier such as text, an image, an icon, a link, or the like. In this case, the identifier 316A displayed at the identifier position 313 is being used to provide a status of a signature associated with a record. The sequential order of the identifier 316A-316D is as follows:

Available
Missing
Not Relevant
Not Verified

Figure 3A:
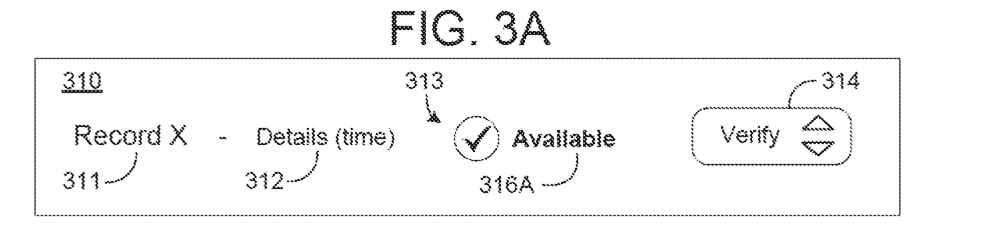
FIGS. 3A-3E are diagrams illustrating a process of interacting with a one-click identifier in accordance with an example embodiment.

In this case, the term "Available" is the identifier 316A initially displayed at the identifier position 313 when the user interface is opened and the record 310 is displayed for the first time by an application, as shown in FIG. 3A. In addition to the text content, the identifier 316A also includes an icon (i.e., checkmark icon) next to the text content. The record 310 also includes a record identifier 311 and details 312 describing the record.

Figure 3B:
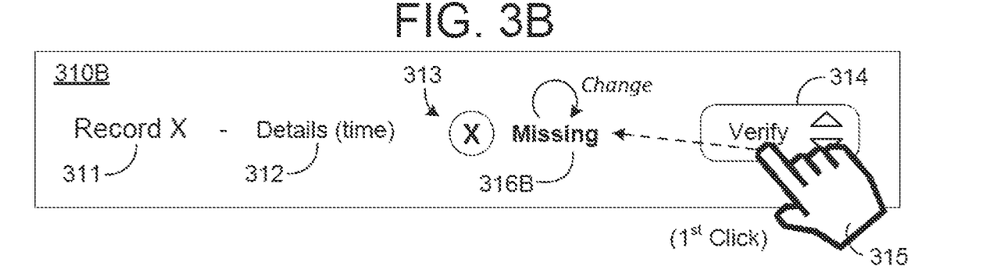

FIG. 3B illustrates a first interaction with the one-click identifier. Referring to FIG. 3B, a user moves a cursor 315 such that it hovers over a position of the button 314. Next, the user generates a command by clicking on a mouse input or touching the screen (in the case of a touchpad) which causes the identifier 316A embedded in the identifier position 313 shown in FIG. 3A to change to a next identifier 316B as shown in the identifier position 313 in the record 310B of FIG. 3B. Here, the system may erase the identifier 316A displayed at the identifier position 313 and replace it with the identifier 316B at the identifier position 313. The identifier 316B is hidden from the screen when the first click is entered causing the button 314 to depress/make a selection. That is, the text content of the identifier 316B is only initialized and output at the identifier position 313 after the click. Therefore, the single click action causes the currently displayed identifier 316A to be replaced with a next identifier 316B without the need for a menu or combo box.

The two identifiers 316A and 316B (i.e., 'Available' and 'Missing') may not be displayed or present on the screen at the same time. In this case, the system may delete the text content "Available" from the identifier position 313 and replace it with the text content "Missing" which has been hidden up to this point, in a simultaneous or near simultaneous action. Meanwhile, the cursor 315 does not need to interact with the text content of the identifier 316A or with the identifier position 313. Instead, the cursor 315 is only used to depress the button 314 (with a single input click or other command). In response, the system changes the text content (and the icon) of the identifier 316A to the text content and the icon of the next identifier 316B within the identifier position 313 that is disposed adjacent to the button 314 and the cursor 315.

When the click/depress of the button 314 is detected, the text content of a next identifier 316B is automatically selected and initialized on the screen by the system based on the previously-defined sequential order. For example, the system may refer to the sequential order in memory, and detect the next identifier 316B based on a currently displayed identifier 316A and its position/location within the sequential order stored in memory. The system may retrieve the next identifier 316B from the list, and output the next identifier 316B at the identifier position 313 as in the example of FIG. 3B. Meanwhile, the remaining elements (e.g., record identifier 311, details 312, and button 314) of the record 310B stay the same as the record 310 of FIG. 3A.

To replace the currently displayed identifier 316A with the next identifier 316B as shown in the identifier position 313 of FIG. 3B, the system deletes the currently displayed identifier 316A at the identifier position 313 such that it is no longer visible on the user interface. Furthermore, the next identifier 316B, which was hidden, is initialized for a first time and output on the screen (at the identifier position 313) at a same vertical and horizontal position as the previously displayed identifier. There are no menus or combo boxes necessary. Rather, simply clicking on the button 314 causes the text content (and icon) of the identifier 316A to be modified.

Figure 3C:
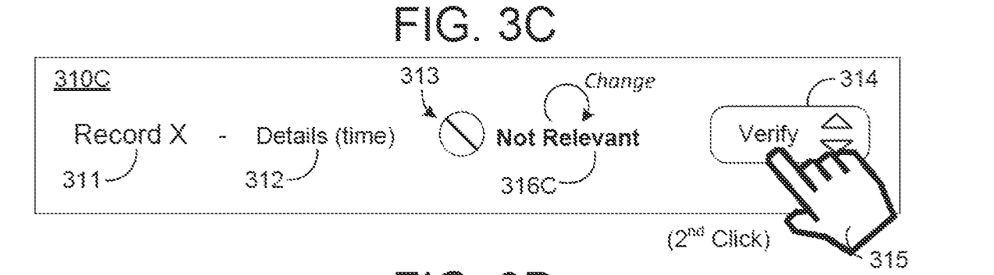
Figure 3D:
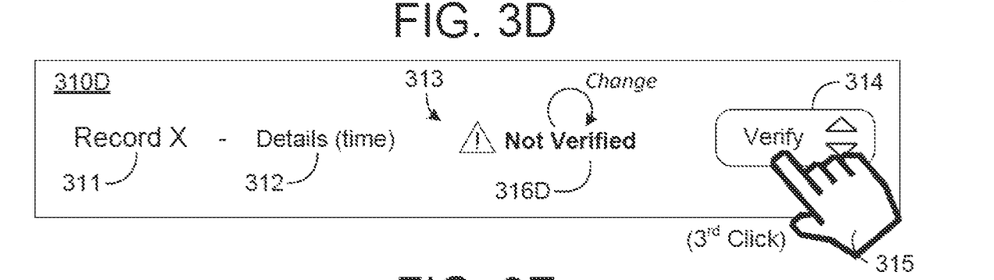
Figure 3E:
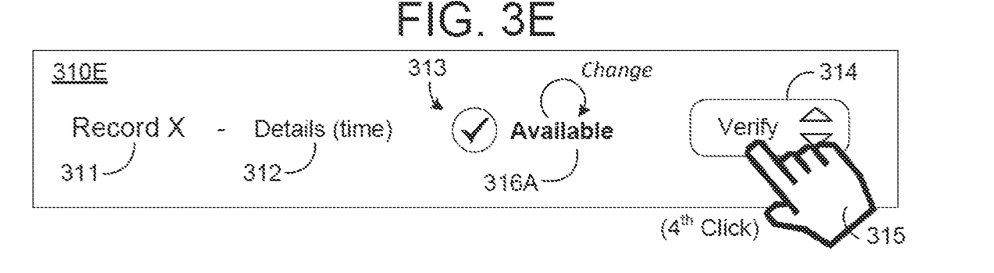

FIG. 3C illustrates a next click (second click) on the button 314. Here, the identifier 316B "Missing" and its icon shown in the identifier position 313 of FIG. 3B is replaced with the text content "Not Relevant" of a next identifier 316C (and its icon) in the identifier position 313 as shown in the example of the record 310C in FIG. 3C. FIG. 3D illustrates a next click (third click) on the button 314. Here, the identifier 316C "Not Relevant" and its icon shown in the identifier position 313 of FIG. 3C is replaced with the next identifier 316D "Not Verified" (and its icon) in the identifier position 313 as shown in the example of the record 310D in FIG. 3D.

Similar to the examples of FIGS. 3B-3D, FIG. 3E illustrates another click (fourth click) of the button 314. In this case, however, the sequential order of the identifier has reached its last item. In particular, the identifier 316D "Not Verified" is the last identifier in the sequential order. In this case, the system detects that the end of the sequential order has been reached, and replaces the identifier 316D as displayed in the identifier position 313 in FIG. 3D, with the first identifier 316A in the sequential order (i.e., "Available") as shown in the identifier position 313 of FIG. 3E. In other words, the application starts the sequential order over when the sequential order has reached its end. This circular order continues in a loop until a user desires to stop clicking on the button 314. That is, the system rotates through the identifiers in the sequential order until a user stops clicking on the button 314. Although not shown in the examples of FIGS. 3A-3E, the identifier 316A-316D may have different colors, symbols, etc.

Figure 4A:
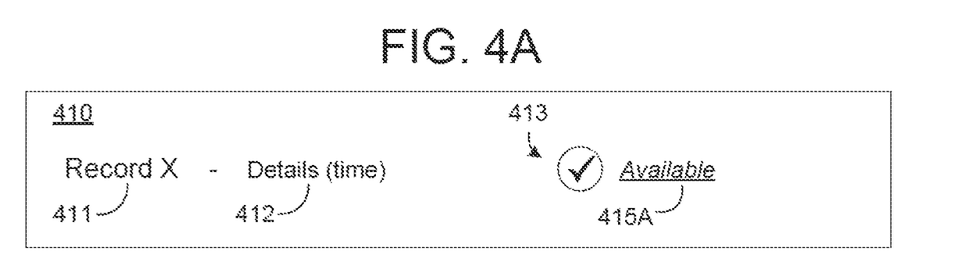
FIGS. 4A-4D are diagrams illustrating a process of interacting with another one-click identifier in accordance with an example embodiment.

FIGS. 4A-4D illustrate a process of interacting with another one-click identifier in accordance with an example embodiment. In the examples of FIGS. 4A-4D, the button (e.g., button 314) is omitted. Rather than having to select the button, the user can move the cursor over a position of the identifier itself, and click directly on the identifier with a single input causing a next identifier to be displayed. Referring to FIG. 4A, a record 410 includes a record identifier 411, details 412, and an identifier 415A "Available" displayed at an identifier position 413. Here, the identifier position 413 is a statically defined pixel location and the identifier 415A includes text content that is displayed against a background of the application template without a menu or combo box. To illustrate that the identifier 415A is interactive, a link (line) under the identifier 415A may be displayed.

Figure 4B:
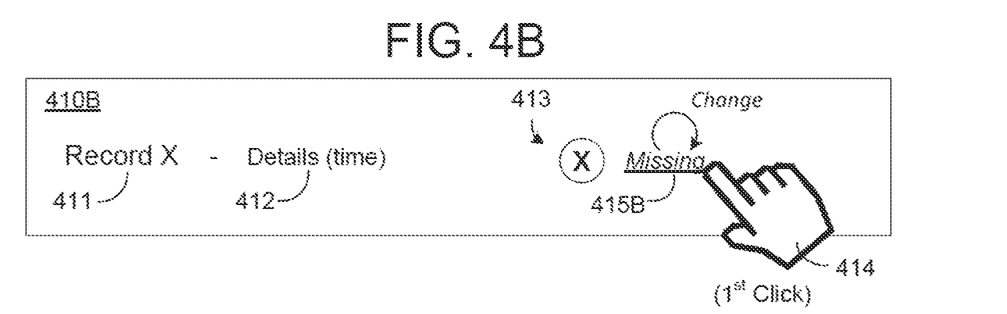

In the example of FIG. 4B, a user clicks on the identifier 415A shown in FIG. 4A, at the identifier position 413, which causes the application to change the identifier 415A to the identifier 415B. Here, the identifier 415B is hidden from the user interface and is initialized when the user clicks on the identifier 415A. In particular, the user may move a cursor 414 over a position of the identifier 415A on the user interface, and perform a single input (click) with a mouse, touch, keyboard command, etc., while the cursor is hovering over the identifier 415A which causes the application to delete the identifier 415A from the screen and automatically populate the next identifier 415B from a sequential order stored in memory. Therefore, instead of a separate button being used, a user can directly click on the identifier 415A-415D itself to cause the next identifier to be displayed.

In FIG. 4B, the application deletes the identifier 415A from the identifier position 413 in the record 410B and outputs a display of the next identifier 415B without the user having to select the next identifier 415B from a list or menu. Instead, the application accesses an internal memory and detects the next identifier 415B from the sequential order based on a location of the currently displayed identifier 415A in the sequential order.

Figure 4C:
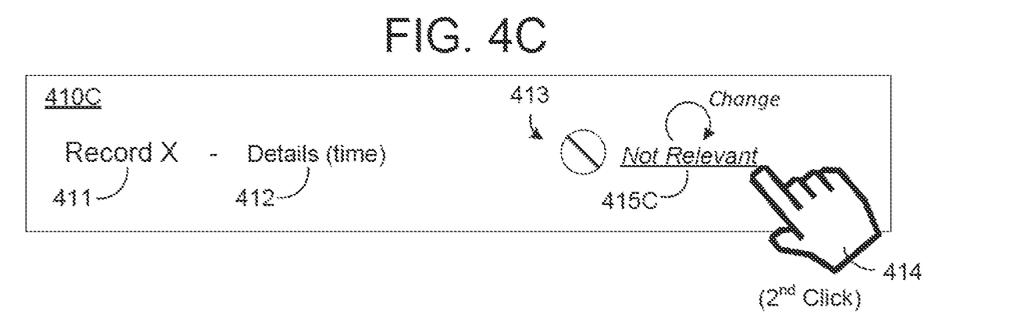
Figure 4D:
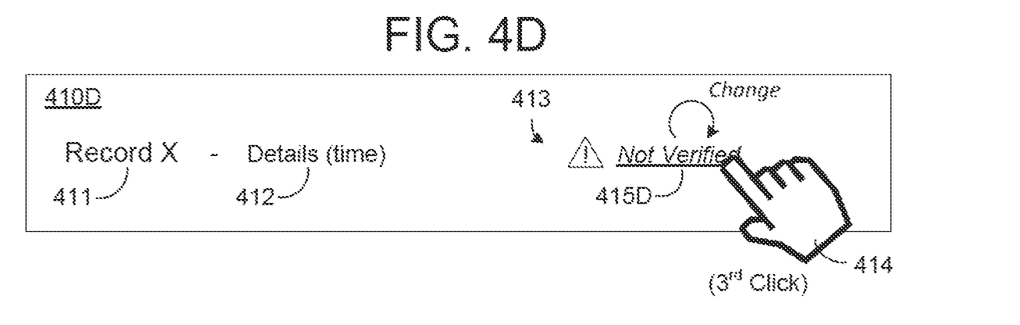

FIG. 4C illustrates a next click (second click) on the identifier. In particular, a user moves the cursor (or keeps the cursor in the same location) and depresses the mouse key or inputs a touch command, etc. on the identifier 415B in the identifier position 413 of the record 410C causing the application to display a next identifier 415C. FIG. 4D illustrates a next click (third click) on the identifier. In particular, a user moves the cursor (or keeps the cursor in the same location) and depress the mouse key or inputs a touch command, etc. on the identifier 415C in the identifier position 413 of the record 410D causing the application to display a next identifier 415D. Each time the user clicks on the identifier 415A-415D, the application checks the sequential order stored in the internal memory and initializes a display of a next identifier in the list. Although not shown, if the user were to click on the identifier 415D, the application would loop back to the first identifier 415A in the sequential order, and the process may be repeated.

Figure 5:
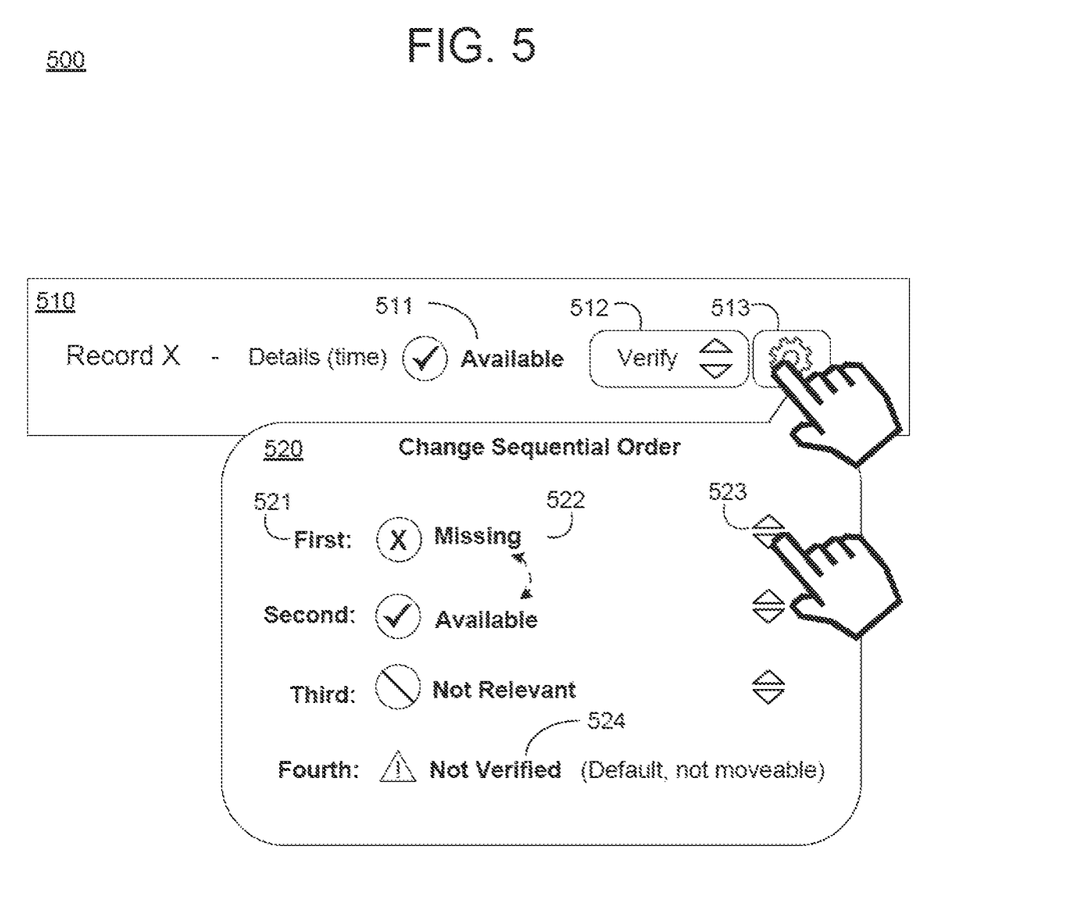
FIG. 5 is a diagram illustrating a process of rearranging a sequential order of identifiers in accordance with an example embodiment.

FIG. 5 illustrates a process 500 of rearranging a sequential order of identifiers in accordance with an example embodiment. Referring to FIG. 5, a record 510 is illustrated and includes a one-click identifier 511, a button 512, and a settings button 513. In this example, the one click identifier 511 and the button 512 are the same as the examples in FIGS. 3A-3E. To change the sequential order of the one-click identifier 511, the user may select the settings button 513 which causes a menu 520 to be displayed. Here, the sequential order of the identifiers is shown including an position 521 (first, second, third, and fourth), an identifier description 522, and a change action 523 which is a combination of buttons capable of moving the identifier up and down in position within the list. However, it should be appreciate that other commands may be used to move an identifier up and down the list such as drag-and-drop, etc.

In the example of FIG. 5, the user has clicked on the down arrow for the initial identifier ("Available") causing it to move down the list while moving the identifier ("Missing") directly b below the identifier ("Available") up the list. In some cases, an identifier may not be movable. In this example, the fourth identifier ("Not Verified") has a position that cannot be moved. To indicate this, the description 524 of the fourth identifier includes text content that notifies that the identifier is not moveable. When a user is done moving the identifiers around in the sequential order, the user may move the cursor back to the settings button 513 and press the button 513 causing the menu 520 to collapse.

Figure 6:
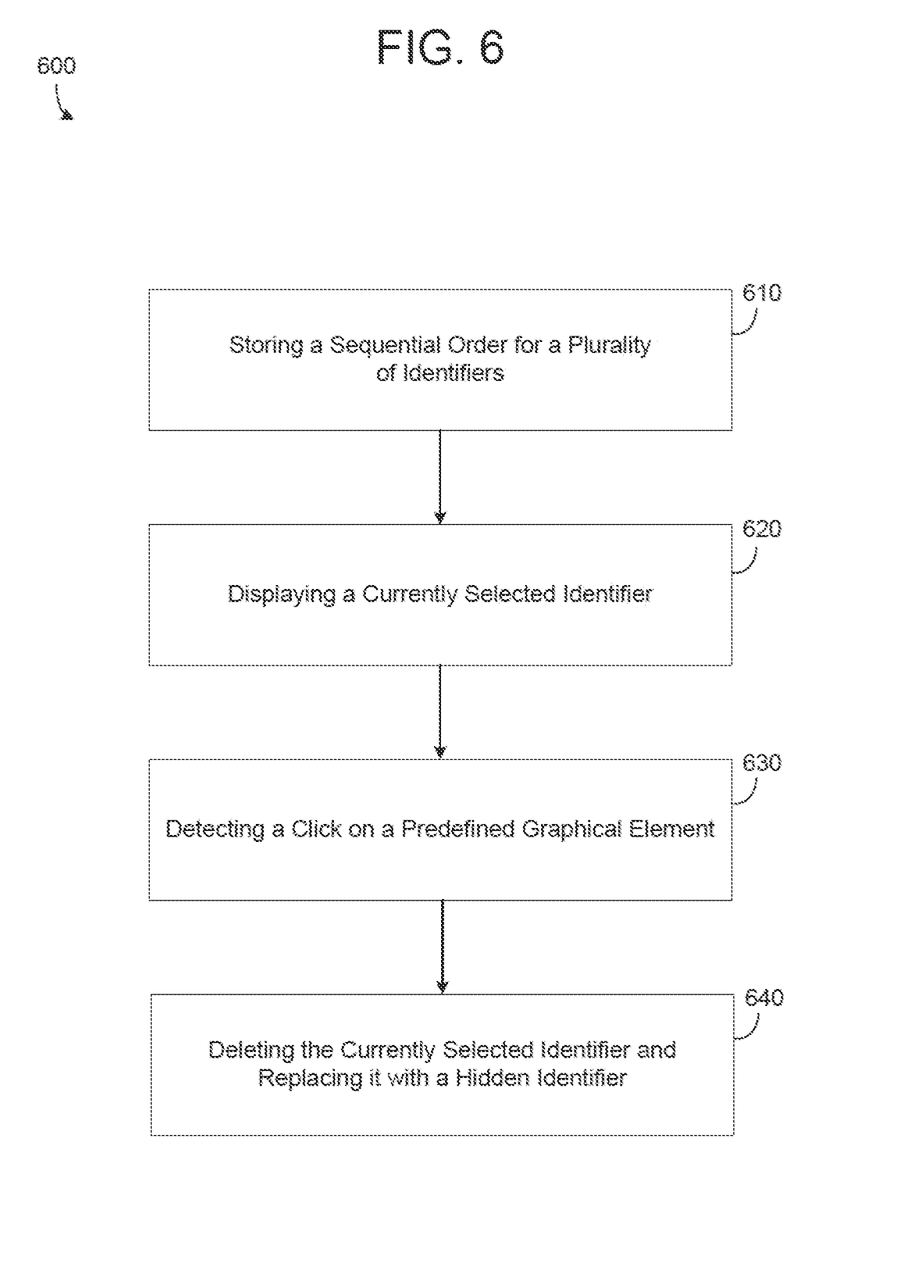
FIG. 6 is a diagram illustrating a method of modifying a one-click identifier on a user interface in accordance with an example embodiment.

FIG. 6 illustrates a method 600 of modifying a one-click identifier on a user interface in accordance with an example embodiment. For example, the method 600 may be performed by a software program running on a database node, a cloud platform, a server, a computing system (user device), a combination of devices/nodes, or the like. Referring to FIG. 6, in 610, the method may include storing a sequential order for a plurality of identifiers. The sequential order may be stored in a memory and hidden from the screen even during a process of changing the sequential identifier.

In 620, the method may include displaying a currently selected identifier from among the plurality of identifiers at a predetermined position on a user interface and hiding remaining identifiers from among the plurality of identifiers from being displayed on the user interface. An initially displayed identifier may be selected by default and automatically displayed when the web page or application page is loaded. The default identifier may be adjusted or may be a statically defined identifier.

In 630, the method may include detecting a click on a predefined graphical element of the user interface, and, in response to detection of the click, in 640 the method may include deleting the currently selected identifier from the user interface and replacing it with a hidden identifier from among the remaining identifiers not displayed on the user interface based on the sequential order. For example, the replacing may include automatically selecting the hidden identifier from among the plurality of hidden identifiers based on a position of the hidden identifier within the sequential order without the user having to select the hidden identifier. Here, the hidden identifier is not displayed on the screen, therefore, the user cannot hover over it using a cursor. Instead, the hidden identifier is selected from the sequential order stored internally within a memory of the application.

In some embodiments, the method may further include detecting a second click on the predefined graphical element of the user interface, and in response to detection of the second click, deleting the hidden identifier from the user interface and replacing it with a next hidden identifier from among the remaining identifiers not displayed on the user interface based on the sequential order. In some embodiments, the detecting may include detecting the click on a statically displayed graphical user interface element (GUI) on the user interface. In some embodiments, the displaying may include displaying the currently selected identifier as a link, and the detecting comprises detecting the click on the link of the currently selected identifier.

In some embodiments, the method may further include receiving a settings command input, and in response to the settings command input, displaying the plurality of identifiers in a vertical list that represents the sequential order. In some embodiments, the method may further include detecting a move command on the vertical list which moves an identifier to a different place in the sequential order, and modifying the sequential order based on the detected move command. In some embodiments, the sequential order may include a circular order that causes a last identifier among the plurality of identifiers in the sequential order to be replaced with a first identifier in the sequential order.

Figure 7:
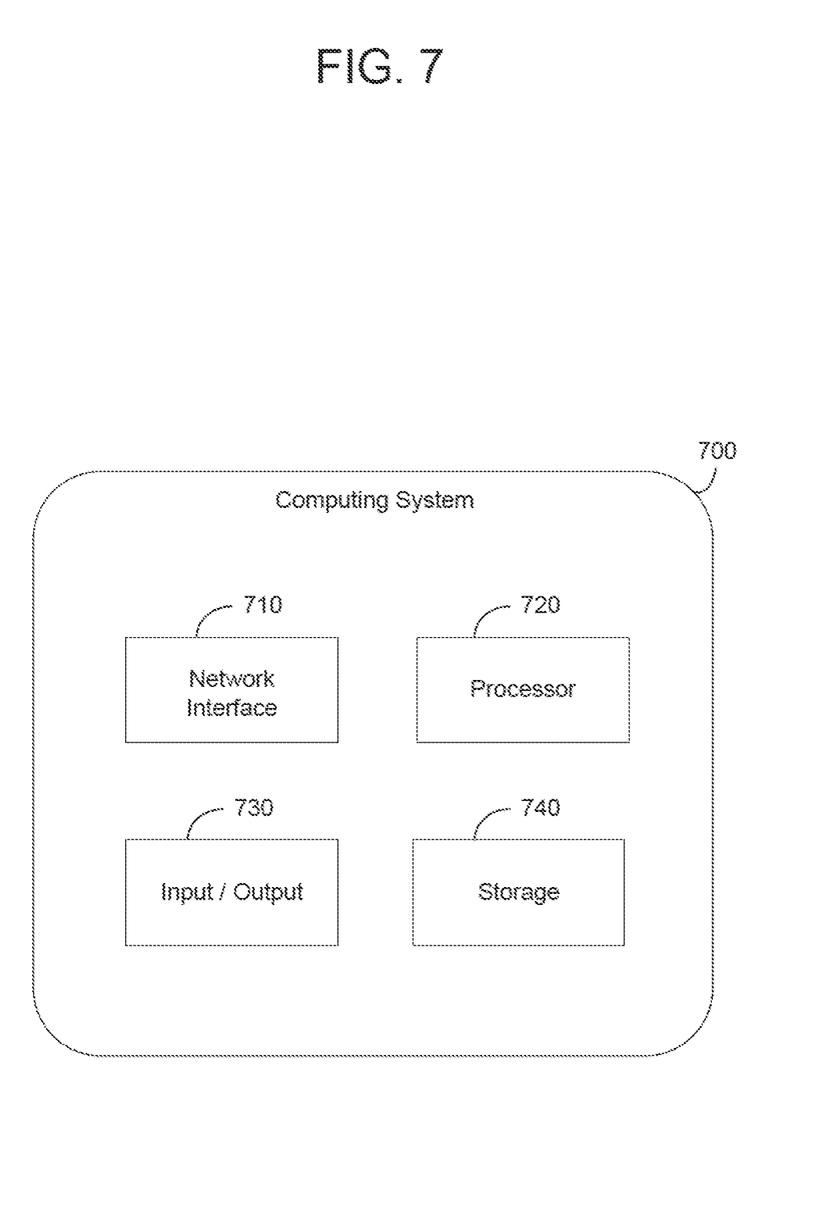
FIG. 7 is a diagram illustrating a computing system for use in the examples herein in accordance with an example embodiment.

FIG. 7 illustrates a computing system 700 that may be used in any of the methods and processes described herein, in accordance with an example embodiment. For example, the computing system 700 may be a database node, a server, a cloud platform, or the like. In some embodiments, the computing system 700 may be distributed across multiple computing devices such as multiple database nodes. Referring to FIG. 7, the computing system 700 includes a network interface 710, a processor 720, an input/output 730, and a storage device 740 such as an in-memory storage, and the like. Although not shown in FIG. 7, the computing system 700 may also include or be electronically connected to other components such as a microphone, a display, an input unit(s), a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The input/output 730 may include an interface, a port, a cable, a bus, a board, a wire, and the like, for inputting and outputting data to and from the computing system 700. For example, data may be output to an embedded display of the computing system 700, an externally connected display, a display connected to the cloud, another device, and the like. The network interface 710, the input/output 730, the storage 740, or a combination thereof, may interact with applications executing on other devices.

The storage device 740 is not limited to a particular storage device and may include any known memory device such as RAM, ROM, hard disk, and the like, and may or may not be included within a database system, a cloud environment, a web server, or the like. The storage 740 may store software modules or other non-transitory instructions which can be executed by the processor 720 to perform the methods and processes described herein. The storage 740 may include a data store having a plurality of tables, partitions, and sub-partitions. The storage 740 may be used to store database records, items, entries, and the like. Also, the storage 740 may be queried using SQL commands.

According to various embodiments, the storage 740 may be configured to store a sequential order for a plurality of identifiers. For example, the sequential order may be stored within an internal memory or data store of an application. The processor 720 may display a currently selected identifier from among the plurality of identifiers at a predetermined position on a user interface and hide remaining identifiers from among the plurality of identifiers from being displayed on the user interface. The processor 720 may detect a click on a predefined graphical element of the user interface. In response to detection of the click, the processor 720 may delete the currently selected identifier from the user interface and replace it with a hidden identifier from among the remaining identifiers not displayed on the user interface based on the sequential order. In some embodiments, the processor 720 may automatically select the hidden identifier from among the plurality of hidden identifiers not displayed on the user interface based on a position of the hidden identifier within the sequential order.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a storage configured to store a sequential order for a plurality of identifiers, where each identifier comprises different text content; and
   a processor configured to:
   display a currently selected identifier from among the plurality of identifiers at a predetermined position on a user interface of an application and hide remaining identifiers from among the plurality of identifiers from being displayed on the user interface, where the currently selected identifier is embedded within a background of a screen displayed on the user interface and not within a box that separates it from other user interface elements on the screen, and the currently selected identifier is displayed next to other user interface items embedded in the background of the screen and that do not belong to the currently selected identifier,
   detect a click on a predefined graphical element of the user interface which is displayed adjacent to and separate from the currently selected identifier embedded within the element of the user interface, and
   in response to detection of the click, delete the currently selected identifier from the element of the user interface and replace it with a hidden identifier that is embedded within the element of the user interface from among the remaining identifiers not displayed on the user interface based on the sequential order.

2. The computing system of claim 1, wherein the processor is configured to automatically select the hidden identifier from among the plurality of hidden identifiers not displayed on the user interface based on a position of the hidden identifier within the sequential order.

3. The computing system of claim 1, wherein the processor is further configured to:
   detect a second click on the predefined graphical element of the user interface, and
   in response to detection of the second click, delete the hidden identifier from the user interface and replace it with a next hidden identifier from among the remaining identifiers not displayed on the user interface based on the sequential order.

4. The computing system of claim 1, wherein the processor is configured to detect the click on a statically displayed graphical user interface element (GUI) on the user interface.

5. The computing system of claim 1, wherein the processor is configured to display the currently selected identifier as a word or group of words, and detect the click on a button that is displayed adjacent to the word or group of words of the currently selected identifier and replace it with a word or group of words of the hidden identifier.

6. The computing system of claim 1, wherein the processor is further configured to:
   detect a settings command input; and
   in response to the settings command input, display the plurality of identifiers in a vertical list that represents the sequential order.

7. The computing system of claim 6, wherein the processor is further configured to detect a move command on the vertical list which moves an identifier to a different place in the sequential order.

8. The computing system of claim 1, wherein the sequential order comprises a circular order that causes a last identifier among the plurality of identifiers in the sequential order to be replaced with a first identifier in the sequential order.

9. The computing system of claim 1, wherein the processor is configured to identify the hidden identifier as a next identifier in the sequential order from an internal data store of the application based on a unique identifier of the application which is assigned to the plurality of identifiers.

10. A method comprising:

storing a sequential order for a plurality of identifiers, where each identifier comprises different text content;

displaying a currently selected identifier from among the plurality of identifiers at a predetermined position on a user interface of an application and hiding remaining identifiers from among the plurality of identifiers from being displayed on the user interface, where the currently selected identifier is embedded within a background of a screen displayed on the user interface that is not within a box that separates it from other user interface elements on the screen, and the currently selected identifier is displayed next to other user interface items embedded in the background of the screen and that do not belong to the currently selected identifier;

detecting a click on a predefined graphical element of the user interface which is displayed adjacent to and separate from the currently selected identifier embedded within the element of the user interface; and in response to detection of the click, deleting the currently selected identifier from the element of the user interface and replacing it with a hidden identifier that is embedded within the element of the user interface from among the remaining identifiers not displayed on the user interface based on the sequential order.

11. The method of claim 10, wherein the replacing comprises automatically selecting the hidden identifier from among the plurality of hidden identifiers based on a position of the hidden identifier within the sequential order.

12. The method of claim 10, further comprising:

detecting a second click on the predefined graphical element of the user interface; and in response to detection of the second click, deleting the hidden identifier from the user interface and replacing it with a next hidden identifier from among the remaining identifiers not displayed on the user interface based on the sequential order.

13. The method of claim 10, wherein the detecting comprises detecting the click on a statically displayed graphical user interface element (GUI) on the user interface.

14. The method of claim 10, wherein the displaying comprises displaying the currently selected identifier as a word or group of words, and the detecting comprises detecting the click on a button that is displayed adjacent to the word or group of words of the currently selected identifier and replacing it with a word or group of words of the hidden identifier.

15. The method of claim 10, further comprising:

receiving a settings command input; and in response to the settings command input, displaying the plurality of identifiers in a vertical list that represents the sequential order.

16. The method of claim 15, further comprising detecting a move command on the vertical list which moves an identifier to a different place in the sequential order, and modifying the sequential order based on the detected move command.

17. The method of claim 10, wherein the sequential order comprises a circular order that causes a last identifier among the plurality of identifiers in the sequential order to be replaced with a first identifier in the sequential order.

18. A non-transitory computer-readable medium comprising instructions which when read by a processor cause the processor to perform a method comprising:

storing a sequential order for a plurality of identifiers, where each identifier comprises different text content;

displaying a currently selected identifier from among the plurality of identifiers at a predetermined position on a user interface of an application and hiding remaining identifiers from among the plurality of identifiers from being displayed on the user interface, where the currently selected identifier is embedded within a background of a screen displayed on the user interface and not within a box that separates it from other user interface elements on the screen, and the currently selected identifier is displayed next to other user interface items embedded in the background of the screen and that do not belong to the currently selected identifier;

detecting a click on a predefined graphical element of the user interface which is displayed adjacent to and separate from the currently selected identifier embedded within the element of the user interface; and in response to detection of the click, deleting the currently selected identifier from the element of the user interface and replacing it with a hidden identifier that is embedded within the element of the user interface from among the remaining identifiers not displayed on the user interface based on the sequential order.

19. The non-transitory computer-readable medium of claim 18, wherein the replacing comprises automatically selecting the hidden identifier from among the plurality of hidden identifiers based on a position of the hidden identifier within the sequential order.

20. The non-transitory computer-readable medium of claim 18, wherein the method further comprises:

detecting a second click on the predefined graphical element of the user interface; and in response to detection of the second click, deleting the hidden identifier from the user interface and replacing it with a next hidden identifier from among the remaining identifiers not displayed on the user interface based on the sequential order.

21. The non-transitory computer-readable medium of claim 18, wherein the detecting comprises detecting the click on a statically displayed graphical user interface element (GUI) on the user interface.

* * * * *